United States Patent
Besharat et al.

(10) Patent No.: US 6,704,566 B1
(45) Date of Patent: Mar. 9, 2004

(54) COMMUNICATION DEVICE FOR PLACING CALLS WITHIN A PLURALITY OF WIRELESS COMMUNICATION NETWORKS

(75) Inventors: Mark Besharat, Boynton Beach, FL (US); John M. Burgan, N. Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 5 days.

(21) Appl. No.: 09/692,072

(22) Filed: Oct. 20, 2000

(51) Int. Cl.⁷ .................................................. H04Q 7/20
(52) U.S. Cl. ...................... 455/414.1; 455/460; 455/564
(58) Field of Search .................................. 455/403, 412, 455/414, 422, 424, 425, 432, 433, 435, 450, 460, 459, 461, 500, 514, 517, 524, 550, 551, 564; 370/347, 410, 352; 379/221.02, 216.01, 355.01, 355.05, 355.06, 355.08

(56) References Cited

U.S. PATENT DOCUMENTS

| | | | | |
|---|---|---|---|---|
| 5,121,423 A | * | 6/1992 | Morihiro et al. | 379/100.14 |
| 5,153,904 A | * | 10/1992 | Coombes et al. | 379/355.08 |
| 5,157,719 A | * | 10/1992 | Waldman | 379/354 |
| 5,276,703 A | * | 1/1994 | Budin et al. | 370/347 |
| 5,473,681 A | * | 12/1995 | Partridge, III | 379/216.01 |
| 5,475,743 A | * | 12/1995 | Nixon et al. | 379/114.15 |
| 5,559,862 A | * | 9/1996 | Bhagat et al. | 455/460 |
| 5,722,088 A | * | 2/1998 | Storn et al. | 455/401 |
| 5,732,349 A | * | 3/1998 | Sanpei et al. | 455/422 |
| 5,909,652 A | * | 6/1999 | Ishikawa et al. | 455/517 |
| 5,946,618 A | * | 8/1999 | Agre et al. | 455/428 |
| 5,950,126 A | * | 9/1999 | Palviainen et al. | 455/423 |
| 5,963,876 A | * | 10/1999 | Manssen et al. | 455/564 |
| 6,029,065 A | * | 2/2000 | Shah | 455/414 |
| 6,054,934 A | * | 4/2000 | Cho et al. | 340/7.25 |
| 6,134,319 A | * | 10/2000 | Burg et al. | 379/213.01 |
| 6,169,799 B1 | * | 1/2001 | McIntosh | 379/354 |
| 6,181,930 B1 | * | 1/2001 | Lee | 370/310 |
| 6,192,124 B1 | * | 2/2001 | Yim | 379/355.08 |
| 6,201,864 B1 | * | 3/2001 | Theis | 379/354 |
| 6,233,450 B1 | * | 5/2001 | Seppanen | 455/426 |
| 6,292,557 B1 | * | 9/2001 | Gabara | 379/355.08 |
| 6,351,636 B2 | * | 2/2002 | Shaffer et al. | 455/414 |
| 6,360,108 B1 | * | 3/2002 | Rogers | 455/564 |
| 6,567,675 B1 | * | 5/2003 | Rosen et al. | 455/564 |

* cited by examiner

Primary Examiner—Jean Gelin
(74) Attorney, Agent, or Firm—Sylvia Chen; Daniel C. Crilly

(57) ABSTRACT

A method for making calls from communication devices that operate within a plurality of wireless communication networks. A call number associated with a call from a communication device is received which communicates with an active network. Based on the received call number, a calling code requirement is selected for dialing the call from the communication device. The calling code requirement is then transmitted to the communication device. The call number or the call number in combination with at least one selected calling code is dialed at the communication device based on the transmitted calling code requirement.

21 Claims, 4 Drawing Sheets

COMMUNICATION DEVICE FOR PLACING CALLS WITHIN A PLURALITY OF WIRELESS COMMUNICATION NETWORKS

FIELD OF THE INVENTION

In general, the present invention relates to the field of communication systems, more particularly, to a communication device that operates within a plurality of wireless communication networks.

BACKGROUND OF THE INVENTION

Communication devices that provide for communication of voice and data are extensively used in telephony and wireless communication systems. For example, European Telecommunication Standard Institute (ETSI) has specified a Global Standard for Mobile Communication (GSM) that uses time division multiple access (TDMA) to communicate control, voice and data information over radio frequency (RF) channels. In the U.S., Telecommunication Industry Association (TIA) has published a number of Interim Standards, such as IS-136, that define various versions of digital advanced mobile phone service (D-AMPS), and analog advanced mobile phone service (A-AMPS), with the capability of transmitting voice and data to subscribers. These types of communication systems cover a geographical area that is subdivided into communication cells, which together provide communication coverage to a service area, for example, an entire city.

Often, communication service subscribers utilize the communication devices for services that are provided over multiple-networks operated by various service providers. For example, subscribers carrying dual-mode wireless communication devices can place calls in a digital system, such as D-AMPS system, as well as an analog system, such as A-AMPS. Depending on the type of available service, i.e., digital or analog, at a local or roaming service area, the dual-mode communication device can automatically provide calling capabilities by detecting the configuration of the available service in the service area. Based on the detected configuration, the communication device then enters a suitable operating mode, i.e. digital or analog mode, thereby allowing the subscriber to place calls in one of multiple networks. Multiple networks may also serve subscribers making domestic or international calls. For example, a subscriber may make calls from a domestic service area that is served by a local IS-136 service provider to an international service area served by one or more GSM networks and vice versa.

When using a communication device within multiple networks (i.e., digital/analog, local/roaming, or domestic/international), calling codes may have to be dialed at the communication device to route a call to a particular service area. Calling codes can be, for example, a country code and an area code that are prefixed to a local call number belonging to a service area to which the call is directed. When a call is placed using a communication device that is subscribed to a local service area, then the subscriber only needs to dial a local call number, without the need to dial additional calling codes for completing the call. However, when the subscriber travels to a different service area, for example, a service area that requires a dual-mode communication device to switch from a digital mode to an analog mode, the subscriber may be required to dial calling codes in addition to the local call number to complete the call. As such, the subscriber may be encumbered by complicated requirements for dialing calling codes when traveling from one service area to another service area.

Moreover, in GSM systems, each GSM communication device includes a slot for inserting a Subscriber Identification Module (SIM) card that stores relevant data to identify the device to a service provider network for security and billing purposes. As such, the same GSM communication device may assume different identities depending on the data that is stored in an inserted SIM card. The ability to insert different SIM cards into the communication device further complicates the calling code dialing requirement for placing a call. For example, if a subscriber uses a SIM card associated with a service provider in the United States, the subscriber must only dial the local call number to complete a local call. However, if the subscriber travels to Germany with the same SIN card and places a local call within the network of a German service provider, the subscriber would need to dial several calling codes before dialing the local German call number. On the other hand, if the subscriber in Germany inserts a SIM card associated with the German service provider, the subscriber could simply dial the German local call number without having to dial any calling codes to complete the call in Germany. However, for dialing a number within the U.S. service area, the subscriber would need to dial additional calling codes for completing the call.

As can be appreciated from the foregoing, the subscribers of communication services are subject to complex calling code dialing requirements when making calls in multiple networks. Accordingly, there exists a need to simplify the requirement for dialing of calling codes at a communication device that operates in a plurality of wireless communication networks.

DETAILED DESCRIPTION OF THE PREFERRED EMBODIMENT

Figure 1:
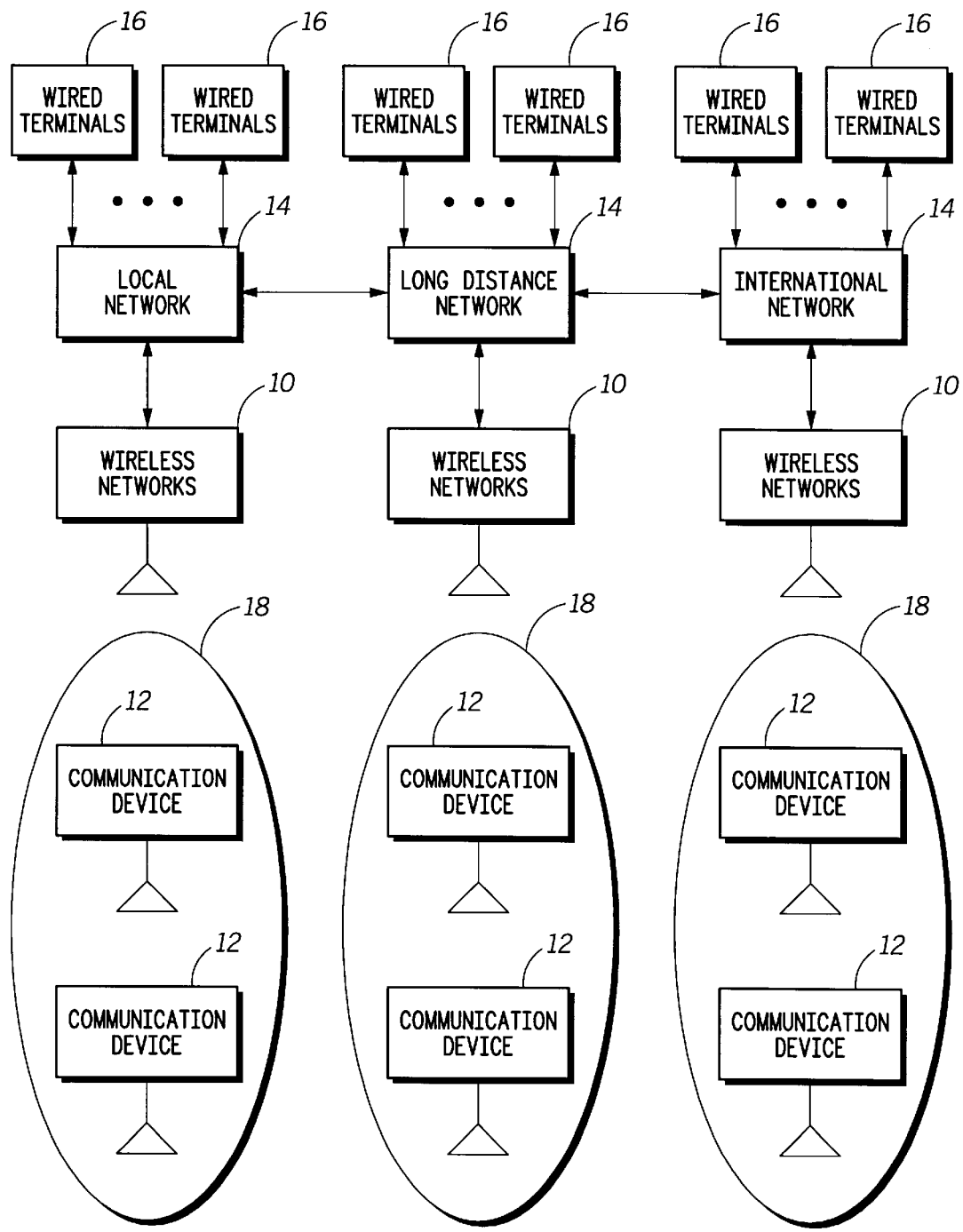
FIG. 1 illustrates a plurality of wireless communication networks communicating with a plurality of communication devices that place calls in accordance with the present invention.

In one aspect, the present invention relates to a communication device that initiates calls within a plurality of wireless communication networks. The communication device includes a storage device that stores one or more call numbers that are used for making calls. The storage device also stores one or more corresponding calling codes associated with using each call number for making calls in other communication networks. One communication network may be the subscribers home network, whereas the other communication networks maybe one of a number of visiting networks. For example, if the communication device uses a local call number to place calls within a local service area served by the home network, all other calling codes, such as areas codes and/or country codes, that are needed for making the call in the visiting communication networks are also stored in the storage device.

The communication device also includes a receiver that receives a calling code requirement from an active network. The active network is the network within which the call is placed by the communication device. In other word, the active network is the network within which the communication devices operates. When dialing a call number, the receiver receives from the active network calling code requirement information relating to whether the call is a local, long distance or international call. As such, the calling codes may be associated with a corresponding service area that is covered by a communication network. Based on the calling code requirement, a call dialer dials the call using the call number or the call number in combination with required calling codes. If changed, the calling codes stored in the storage device may be updated based on updated calling code requirements received from the communication networks.

In accordance with some of the more detailed features of the present invention, the communication device also includes a transmitter that transmits a request for the calling codes from a network. Under this arrangement, the storage device also stores the one or more calling codes that are received from the network in response to the transmitted request.

According to other more detailed features of the invention, the communication device also includes an identity module, such as a SIM card, which identifies the communication device to the active network. When the identity module is used in the communication device, the calling code requirement received from the active network is selected based on the identity of the communication device at the active network. For example, when dialing a local call from the communication device, which based on information stored in an inserted SIM card, is identified by the network as belonging to a visiting network, the calling code requirement is selected to specify the call as a long distance call. On the other hand, if the SIM card identifies the communication device as belonging to the home network, the calling code requirement is selected to specify the call as a local call.

According to another aspect of the invention, a communication network that supports calls made by communication devices includes a receiver that receives a call number associated with a call made by the devices. A call processor selects a calling code requirement based on the received call number, and a transmitter transmits the calling code requirement to the communication devices. A call receiver receives a call from the communication device that is dialed using the call number or the call number in combination with selected calling codes.

According to still another aspect of the invention, a method for making calls from the communication devices receives a call number associated with a call from a communication device. Based on the received call number, a calling code requirement is selected for dialing the call from the communication device. The method also involves transmitting the calling code requirement to the communication device, and dialing the call number or the call number in combination with at least one selected calling code at the communication device, based on the transmitted calling code requirement.

FIG. 1 illustrates a plurality of wireless communication networks 10 communicating with a plurality of communication devices 12 that place calls in accordance with the present invention. Examples of the communication devices 12 that can be used with the invention include smart phones, Personal Digital Assistances (PDA), or portable computers, such as a lap tops, or palm tops that operate with or without a cellular telephone. A wide range of wireless communication networks alone or in any combination can employ the communication devices 12 of the present invention. Examples of such networks include well-known digital and analog cellular networks, such as, AMPS, D-AMPS, GSM, IS-95, IS-136, IS-54, etc. The present invention may also be implemented in newly developed systems such as Bluetooth as well as any one of UMTS, G2, G2.5, and G3 wireless systems that have already been defined or are in the process of being defined.

Within any one of these systems, service subscribers can use communication services of wireless or wired service providers to place calls to another subscriber that is subscribed to a wired or wireless service provider. Wired networks 14, such as those provided by local, long distance and international service carrier networks interface in a well known manner with the wireless networks 10. As a result, wired terminals 16, for example, a conventional telephone, can be used to receive or initiate calls to and from the wireless communications devices 12. Alternatively, any one of the communication devices 12 can initiate calls to any other communication device 12 or wired terminal connected to any of the wireless or wired networks 10 or 14.

As shown, each wireless network 10 provides service to a corresponding service area 18. As such, the communication devices 12 can operate within the service area 18 of each wireless network while the subscribers carrying the communication devices 12 travel from one location to another through the service areas. Once within the service area of a wireless network, the communication devices 12 utilize specified registration protocols to register their presence within the network. Once registered, the communication device uses the registered network as its active network for placing calls directed to wired terminals 16 or wireless communication devices 12.

Figure 2:
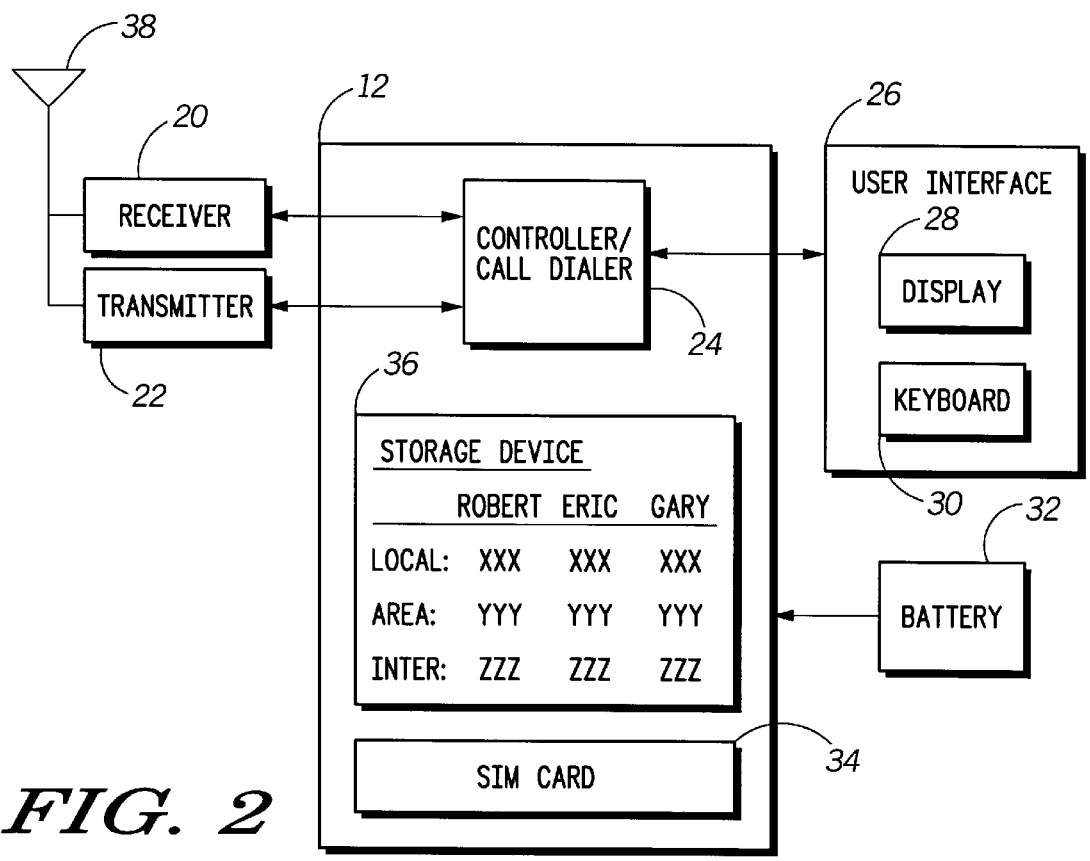
FIG. 2 shows an electrical block diagram of a communication device that dials calls in accordance with the present invention.

FIG. 2 shows an electrical block diagram of a communication device 12 that dials calls in accordance with the present invention. The communication device 12, which is powered by a battery 32, establishes a communication link with a wireless communication network (shown in FIG. 1) using a receiver 20 and a transmitter 22 that receive and transmit information via an antenna 38 in a well known manner. The communication device 12 operates under the control of a controller 24 that allows a user to interface with the communication device 12 via a user interface 26 that, for example, includes a display 28 or an input device such as a keyboard 30. The controller 24 has access to a storage device 36 that stores various information relating to the operation of the communication device 12.

According to the present invention, the storage device 36 includes a database storing various frequently used call numbers that may be associated with corresponding names. For each call number, the storage device 36 stores all of the required calling codes for making a call in all of the networks that the communication device 12 is designed to operate. As shown, the examples of the calling codes include area codes (yyy), international calling codes (zzz) etc.

In one exemplary arrangement, the communication device 12 may be a GSM-enabled communication device 12 that includes a SIM card 34 that identifies the communication device to a GSM active network. As such, the communication device 12 under this exemplary embodiment can assume an identity that corresponds to data stored in an inserted SIM card 34. Under the shown embodiment, the dialing of calling codes and call numbers is performed by the controller acting as a call dialer.

Figure 3:
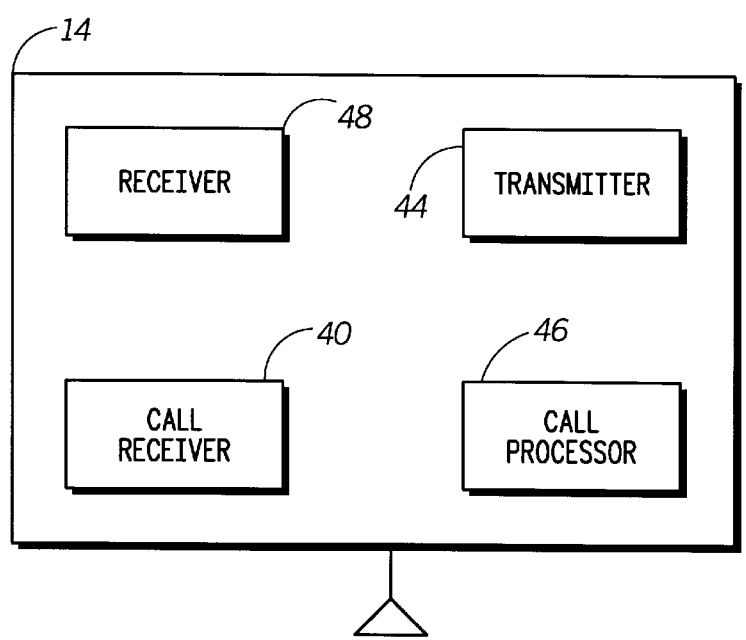
FIG. 3 illustrates a block diagram of a communication network, for example, a GSM communication network, which provides wireless voice and data communication capability for a plurality of communication devices.

FIG. 3 illustrates a block diagram of a communication network 14, for example, a GSM communication network, which provides wireless voice and data communication capability for a plurality of communication devices 12. The mode of operation of the GSM communication network is described in European Telecommunication Standard Institute (ETSI) documents ETS 300 573, ETS 300 574 and ETS 300 578, which is hereby incorporated by reference. Therefore, the operation of the GSM communication system is described only to the extent necessary to enable a skilled person to make and use the present invention. Although the present invention is described as embodied in a GSM communication system, those skilled in the art would appreciate that the present invention can be used with a wide variety of other communication networks, including but not limited to those mentioned above.

In general, each communication network 14 includes a receiver 40 for receiving a call number from the communication device 12; a call processor 46 for processing calling code requirements; a transmitter 44 for transmitting calling code requirements to the communication device 12; and a call receiver 48 that receives the dialed call number or the call number in combination with the calling code requirements from the communication devices 12.

Figure 4:
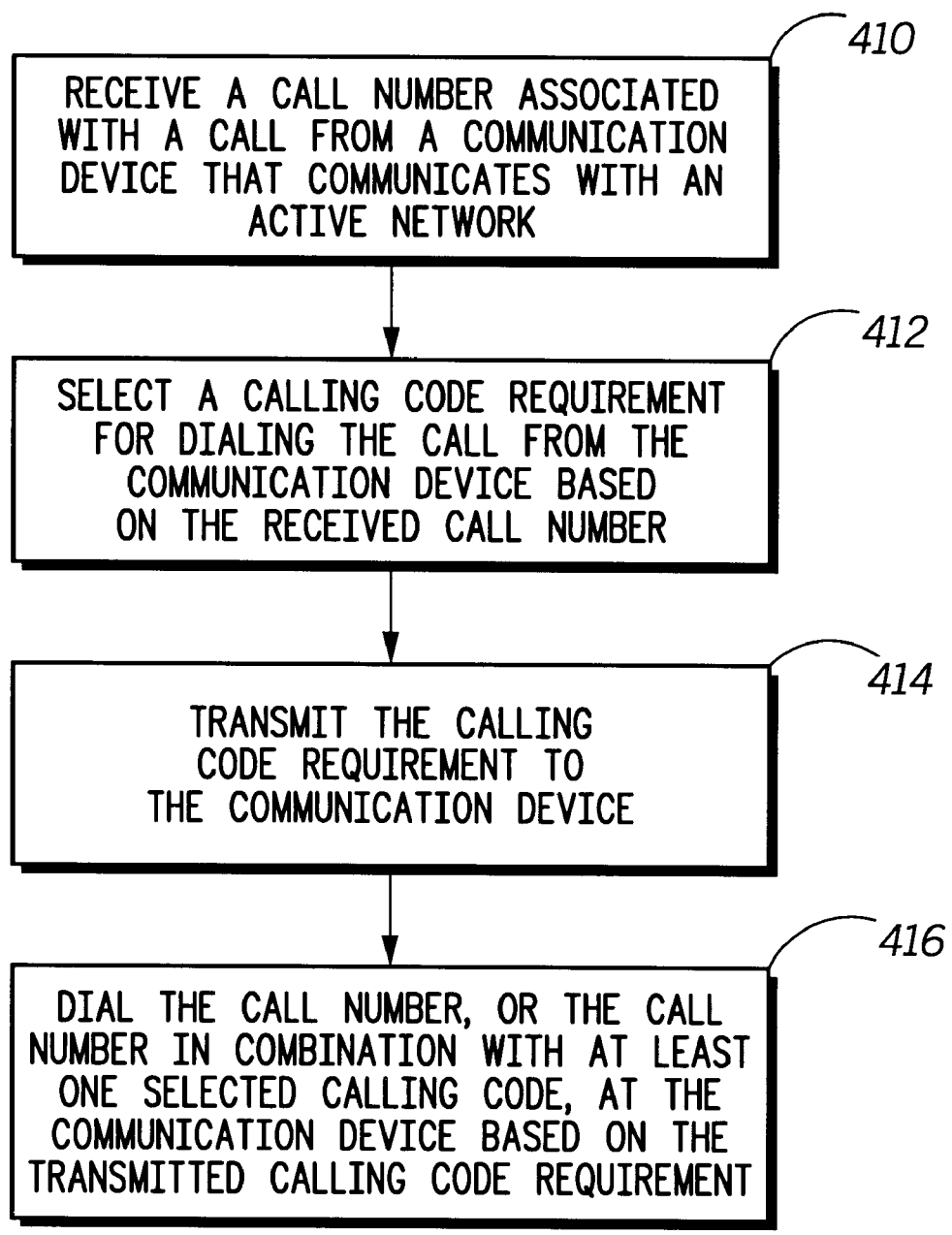
FIG. 4 illustrates a block diagram of a method for a communication network in accordance with the present invention.

Referring to FIG. 4, the active network receives a call number associated with the call from the communication device 12, block 410. The active network elects the calling code requirement, via a call processor 46, for dialing the call from the communication device 12 in the active network, block 412. The calling code requirement is information corresponding to a location of the active network relative to a location of a dialed communication network.

The active network transmits the calling code requirement to the communication device 12, block 414. Based on the calling code requirement, the communication device 12 can select the necessary call number from the storage device 36 in order to complete the call. The communication device 12 dials the call number or the call number in combination with the calling code requirements, block 416. Based on the calling code requirement received from the active network the communication device 12 can determine which calling code to combine with the call number to complete the call.

For example, if a communication device 12 which operates within a home network were to move to a visiting network, calling codes are required to dial the home network or other networks in the plurality of communication networks 10, 14. Therefore, the communication device 12 requests calling code requirements from the visiting network, now acting as the active network, in order to dial other communication devices 12 or wired terminals 16 in the plurality of communication networks 10, 14. Upon receiving the calling code requirements, the communication device 12 accesses previously stored call numbers and call numbers in combination with calling code requirements in order to match the stored call number with the received call number. The communication device 12 then dials and transmits the required call number which is received by the call receiver in the visiting network within the plurality of communication networks 10, 14.

Figure 5:
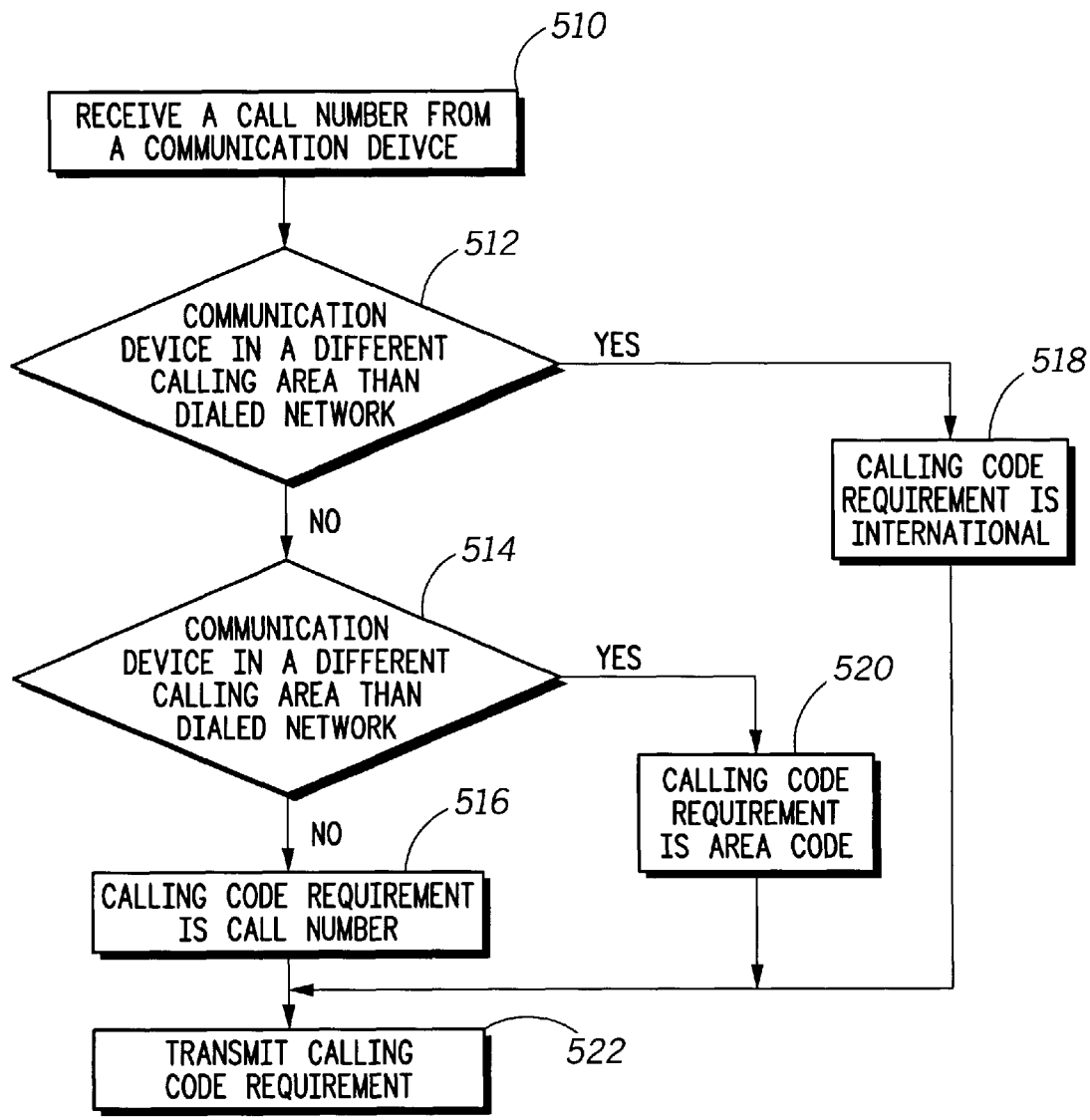
FIG. 5 illustrates a block diagram of the method for determining a call number or a call number in combination with calling code requirements.

FIG. 5 illustrates a block diagram of the method for determining a call number or a call number in combination with calling code requirements. The communication network receives the call number from the communication device 12, block 510. A decision is made whether or not the communication device 12 is in a different calling area than the dialed communication network, block 512. If the communication device 12 is in a different calling area, such as in a different country than the dialed communication network then the calling code requirement is one of an international requirement. The communication device 12 would interpret the international requirement as needing the country code, the area code and the call number. If the communication device 12 is in a different calling area, but in the same country as the dialed communication network then a different decision is made in block 514.

A decision is made as to whether or not the communication device 12 is in a different calling area than the dialed communication network, block 514. If the communication device 12 is in a different calling area than the dialed communication network then the calling code requirement is one of an area requirement. The communication device 12 would interpret the area requirement as needing the area code and the call number. If the communication device 12 is in the same calling area as the dialed communication network then the calling code requirement is only the call number as shown in block 516. The communication network transmits the calling code requirement to the communication device 12, block 522.

From the foregoing description it would be appreciated that the present invention significantly simplifies the requirement for dialing calling codes on the part of the subscribers. By storing the required calling codes associated with the call numbers at the communication device, the present invention automatically dials the calling codes based on the calling code requirement that is received from the active network. As such, the burden of dialing complex calling codes is avoided using a communication device that operates in accordance with the present invention.

The invention has been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A communication device that initiates calls within a wireless communication network, the communication device comprising:

a storage device in which a call number and at least one associated calling code is prestored to facilitate making a call in the wireless communication network;

a transmitter that transmits the call number to the wireless communication network;

a receiver that receives a calling code requirement, based on the call number, from the wireless communication network responsive to transmission of the call number; and a call dialer that dials the call using the call number alone or in combination with at least one associated, prestored calling code based on the calling code requirement received from the wireless communication network.

2. The communication device of claim 1, wherein the wireless communication network is a home network assigned to the communication device.

3. The communication device of claim 1, wherein the wireless communication network is a visiting network to which the communication device is not assigned.

4. The communication device of claim 1, wherein the at least one associated calling code is associated with a service area covered by the wireless communication network.

5. The communication device of claim 4, wherein the call number is a local number for the service area covered by the wireless communication network.

6. The communication device of claim 1, wherein the at least one associated calling code comprises at least one of an area code and a country code.

7. The communication device of claim 6, wherein phone number identifiers differentiate between a local number, the area code, and the country code.

8. The communication device of claim 1, further including an identity module that identifies the communication device to the wireless communication network, wherein the calling code requirement received from the wireless communication network is selected based on an identity of the communication device at the wireless communication network.

9. The communication device of claim 1, wherein the at least one associated calling code is updated based on updated calling code requirements received from the wireless communication network.

10. A communication network that supports calls made by communication devices operating within a plurality of communication networks, comprising:

a receiver that receives a call number associated with the calls made by a communication device;

a call processor that selects a calling code requirement based on the call number which is received;

a transmitter that transmits the calling code requirement to the communication device; and a call receiver that receives a call from the communication device that is dialed using the call number or the call number in combination with at least one calling code that is selected based on the calling code requirement being transmitted.

11. The communication network of claim 10, wherein one of the plurality of communication networks is a home network assigned to the communication device.

12. The communication network of claim 11, wherein the communication network is a visiting network.

13. The communication network of claim 10, wherein the at least one calling code is associated with a service area covered by one of the plurality of communication networks.

14. The communication network of claim 13, wherein the call number is a local number for the service area covered by one of the plurality of communication networks.

15. The communication network of claim 10, wherein the at least one calling code comprises at least one of an area-code and a country-code.

16. The communication network of claim 10, wherein the calling code requirement is selected based on an identity of the communication device at the communication network.

17. The communication network of claim 10, wherein the transmitter transmits an updated calling code requirement to the communication device.

18. A method for making calls from communication devices that operate within a plurality of wireless communication networks comprising the steps of:

receiving a call number associated with a call from a communication device that communicates with an active network;

based on the call number which is received, selecting a calling code requirement for dialing the call from the communication device;

transmitting the calling code requirement to the communication device; and dialing the call number or the call number in combination with at least one calling code which is selected at the communication device based on the calling code requirement which is transmitted.

19. The method of claim 18, wherein the at least one calling code requirement which is selected based on an identity of the communication device at the active network.

20. A method for a communication device to initiate a call in a wireless communication network, the method comprising the steps of:

transmitting a call number to the wireless communication network;

receiving a calling code requirement, based on the call number, from the wireless communication network responsive to transmission of the call number; and dialing the call number alone or in combination with an associated, prestored calling code based on the calling code requirement.

21. The method of claim 20, wherein the associated, prestored calling code is at least one of an area code and an international country code.

* * * * *